3,113,988
PROCESS FOR THE ALKYLATION OF SATURATED
HYDROCARBONS
Erwin E. Meisinger, Elmhurst, Ill., assignor to Universal Oil Products Company, Des Plaines, Ill., a corporation of Delaware
No Drawing. Filed Sept. 7, 1961, Ser. No. 136,447
19 Claims. (Cl. 260—683.53)

This application is a continuation-in-part of my copending application Serial No. 862,058, filed December 28, 1959, now abandoned. This invention relates to the alkylation of saturated hydrocarbons in the presence of a novel catalyst. More particularly this invention relates to the alkylation of an alkylatable saturated hydrocarbon with an olefin-acting compound at alkylation conditions in the presence of an alkylation catalyst comprising a Friedel-Crafts metal halide impregnated on nickel oxide composited with an adsorbent siliceous material.

An object of this invention is to produce alkylated saturated hydrocarbons and particularly to produce isoparaffin hydrocarbons. A specific object of this invention is to produce substantially saturated gasoline boiling-range hydrocarbons having high anti-knock values which may be utilized as components of gasoline suitable for use in airplane and/or automobile engines.

Numerous catalysts have been proposed for the alkylation of paraffin hydrocarbons with olefin-acting compounds including liquid catalysts, such as sulfuric acid, hydrogen fluoride, etc. Similarly, solid catalysts such as aluminum chloride, aluminum bromide, metal oxides, metal sulfides, and clays have been proposed as catalysts for this reaction. Each of these prior art catalysts suffer from at least one inherent disadvantage, and it is a further object of this invention to provide an alkylation catalyst which overcomes each and all of such disadvantages. For example, the prior art teaches that the above-mentioned liquid catalysts are not satisfactory alkylation catalysts for the reaction of isobutane with ethylene. Sulfuric acid is not a satisfactory catalyst for the alkylation of isobutane with propylene. In addition, sulfuric acid has the inherent disadvantage that rapid deterioration of the catalyst takes place during use. Considerable sludge formation and undesirable side reactions occur when aluminum chloride alone is used as the catalyst for the alkylation reaction. Metal oxides, clays, etc., which are stable, solid catalysts can only be utilized at high temperatures and high pressures. The use of the novel catalyst of the present invention overcomes these and other disadvantages which are well known to one skilled in the art.

In its broadest aspect the present invention embodies a process for the alkylation of an alkylatable saturated hydrocarbon with an olefin-acting compound at alkylation conditions in the presence of a catalyst comprising a Friedel-Crafts metal halide impregnated on an oxide of a metal of the iron group composited with an adsorbent siliceous material.

Another embodiment relates to a process for the alkylation of an alkylatable saturated hydrocarbon with an olefin-acting compound at alkylation conditions in the presence of a catalyst comprising aluminum chloride impregnated on nickel oxide composited with an adsorbent siliceous material.

A further embodiment relates to a process for the alkylation of an alkylatable isoparaffin with an olefin-acting compound at alkylation conditions in the presence of a catalyst comprising aluminum chloride impregnated on nickel oxide-composited with an adsorbent siliceous material.

Still another embodiment relates to a process for the alkylation of isobutane with an olefin-acting compound at alkylation conditions in the presence of a catalyst comprising aluminum chloride impregnated on nickel oxide composited with an adsorbent siliceous material.

A specific embodiment of this invention relates to a process for the alkylation of isobutane with ethylene at alkylation conditions in the presence of a catalyst comprising aluminum chloride impregnated on nickel oxide composited with diatomaceous earth.

Another specific embodiment relates to a process for the alkylation of isobutane with propylene at alkylation conditions in the presence of a catalyst comprising aluminum chloride impregnated on nickel oxide composited with diatomaceous earth.

A still further specific embodiment of this invention relates to a process for the alkylation of isobutane with a butene at alkylation conditions in the presence of a catalyst comprising aluminum chloride impregnated on nickel oxide composited with diatomaceous earth.

Other embodiments of the present invention will become apparent in the following detailed specification as hereinafter set forth.

A unique catalyst composition has been discovered which embodies certain characteristics highly desirable in alkylation processes. The catalyst comprises a Friedel-Crafts metal halide impregnated on an oxide of a metal of the iron group composited with an adsorbent siliceous material. Although the catalyst of the present invention includes a Friedel-Crafts metal halide it possesses superior properties when utilized under reaction conditions of temperature, pressure, space velocity, etc., ordinarily used with a Friedel-Crafts metal halide alone. For example, sludge formation, which seriously hampers the commercial application of Friedel-Crafts metal halides as alkylation catalysts, is reduced to such an extent as to be substantially eliminated as a factor adversely effecting the alkylation reaction. Furthermore, an oxide of a metal of the iron group composited with an adsorbent siliceous material generally is considered to have little or no catalytic effect on the alkylation of saturated hydrocarbons under the reaction conditions utilized with a Friedel-Crafts metal halide catalyst. Thus, a catalyst comprising nickel oxide composited with kieselguhr, wherein the nickel oxide comprises from about 45% to about 65% of the total catalyst weight, has little if any catalytic activity in relation to the alkylation of isobutane with ethylene, propylene, or a butene under conditions normally utilized for such alkylation reactions wherein aluminum chloride is utilized as the alkylation catalyst. It is therefore surprising that an oxide of a metal of the iron group composited with kieselguhr enhances the catalytic properties of a Friedel-Crafts metal halide when utilized as an alkylation catalyst according to the process of this invention.

As hereinbefore set forth, the novel catalyst for the alkylation of saturated hydrocarbons comprises a Friedel-Crafts metal halide impregnated on an oxide of a metal of the iron group composited with an adsorbent siliceous material. The Friedel-Crafts metal halide preferably comprises aluminum chloride. Other Friedel-Crafts metal halides utilizable as catalyst components within the scope of the present invention are aluminum bromide, zinc chloride, zirconium chloride, gallium chloride, titanium tetrachloride, ferric chloride, ferric bromide, antimony chloride, antimony bromide, bismuth chloride, and others which are well known to one skilled in the art.

The above described Friedel-Crafts metal halides are utilized in conjunction with an oxide of a metal of the iron group composited with an adsorbent siliceous material. Such siliceous materials include naturally occurring materials which are predominantly siliceous in character such as diatomaceous earth which is frequently referred to as siliceous earth, diatomaceous silica, kieselguhr, etc. While artificially prepared porous silicas are utilizable, it appears that minor amounts of aluminum oxide, present in the naturally occurring diatomaceous earth, contribute to the total catalytic effect of the catalyst. Utilizable adsorbent siliceous materials also include certain naturally occurring aluminum silicates such as the various fuller's earths, and clays such as bentonite, montmorillonite, etc.

It is preferred to utilize nickel oxide composited with an adsorbent siliceous material. Iron and cobalt oxides can also be employed but not necessarily with equivalent results. The metal oxide selected from the iron group metal oxides is preferably composited with diatomaceous earth to the extent of from about 55% to about 80% of the total weight of said metal oxide and diatomaceous earth. However, excellent results have been obtained wherein the metal oxide comprised from about 65% to about 70% of the total weight and a metal oxide content within this more restricted range is preferred.

The oxide of a metal of the iron group can be composited with the adsorbent siliceous material in any convenient or conventional manner. For example, diatomaceous earth is suspended in an aqueous solution of nickel sulfate and a hot saturated solution of sodium carbonate gradually added thereto with constant agitation. The liquid is then decanted to leave the diatomaceous earth with precipitated nickel carbonate composited therewith. The product is dried and subjected to temperatures of about 300° C. thereby eliminating carbon dioxide and leaving the desired nickel oxide composited with the diatomaceous earth. This material is generally utilized in a pelleted form although this particular shape is not essential to the process of this invention.

The diatomaceous earth, with an oxide of a metal of the iron group composited therewith, is further treated with a Friedel-Crafts metal halide above described in such a manner as to include said Friedel-Crafts metal halide thereon to the extent of from about 15% to about 40% or preferably from about 15% to about 25% of the total catalyst weight. This can be accomplished in any conventional manner. For example, in one method the Friedel-Crafts metal halide may be sublimed onto the diatomaceous earth previously composited with an oxide of a metal of the iron group. A further method comprises the addition of the Friedel-Crafts metal halide, continuously or intermittently, to a reactor containing therein an oxide of a metal of the iron group composited with diatomaceous earth, which may or may not have previously had a Friedel-Crafts metal halide deposited thereon. This can be accomplished by dissolving the Friedel-Crafts metal halide in one or more of the reactants, such as aluminum chloride dissolved in isobutane, prior to charging said reactants to the reactor.

In contrast to Friedel-Crafts metal halides, the catalysts of the present invention do not form substantial amounts of complexes with unsaturated hydrocarbons and, accordingly, they may be used in continuous processes over extended periods of time with relatively little contamination by such complexes so that in most instances the catalyst life is considerably longer than the life of the corresponding Friedel-Crafts metal halide in similar types of hydrocarbon conversion reactions.

As hereinbefore set forth, the present invention relates to a process for the alkylation of an alkylatable saturated hydrocarbon with an olefin-acting compound at alkylating conditions in the presence of a catalyst comprising a Friedel-Crafts metal halide impregnated on an oxide of a metal of the iron group composited with an adsorbent siliceous material. Many saturated hydrocarbons are utilizable as starting materials in this process. Preferred saturated hydrocarbons are isoparaffins and naphthenic hydrocarbons containing one or more alkyl groups. Suitable paraffin hydrocarbons include isobutane, isopentane, 2-methylpentane, 3-methylpentane, 2,3-dimethylbutane, 2-methylhexane, 3-methylhexane, 2-methylheptane, 3-methylheptane, etc., and other isoparaffins containing at least one tertiary carbon atom per molecule. Cycloparaffin hydrocarbons suitable as starting materials include methylcyclopentane, methylcyclohexane, etc.

Isobutane is the isoparaffin commonly subjected to alkylation commercially, although higher molecular weight isoparaffins also react with olefin-acting compounds under similar or modified conditions of operation to produce branched chain paraffinic hydrocarbons other than the isoparaffinic hydrocarbons charged to the process. However, as the higher molecular weight isoparaffins such as is isopentane, isohexane, etc. are in themselves valuable constituents of high anti-knock gasoline, they are consequently less commonly used than isobutane as charge stocks for the alkylation process. Of the various naphthenic hydrocarbons which may be alkylated in the presence of the catalyst described herein to produce naphthenic hydrocarbons of more highly branched chain structure, methylcyclopentane and its alkyl derivatives are commonly employed in such alkylation; however, cyclopentane and cyclohexane and alkyl derivatives of cyclohexane containing at least one tertiary carbon atom per molecule may be utilized to advantage. The resulting alkylates are utilizable as such or as components for high anti-knock gasoline. In the alkylation reaction, normal paraffins such as normal butane, normal pentane, normal hexane, normal heptane, etc., are utilizable to varying extents depending upon the degree of isomerization of the normal paraffinic hydrocarbon prior to the alkylation reaction. Since the catalyst of the present invention is extremely active, such combination isomerization-alkylation reactions are not surprising and are thus within the generally broad scope of this invention.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates, and also esters of various carboxylic acids. The preferred olefin-acting compounds are olefinic hydrocarbons or olefins comprising monoolefins having one double bond per molecule and polyolefins which have more than one double bond per molecule. Monoolefins which may be utilized for alkylating paraffin hydrocarbons in the presence of the hereinabove described catalyst are either normally gaseous or normally liquid and include ethylene, propylene, 1-butene, 2-butene, isobutene, pentenes, and higher molecular weight normally liquid olefins, the latter including various olefin polymers having from about 6 to about 18 carbon atoms per molecule. Cycloolefins such as cyclohexane, cyclopentene, and various alkycycloolefins may also be utilized but generally not under the same conditions of operation applying to the cyclic olefins. The polyolefinic hydrocarbons utilizable in the process of the present invention include conjugated diolefins such as butadiene and isoprene, as well as nonconjugated diolefins and other polyolefinic hydrocarbons containing more than two double bonds per molecule.

Alkylation of the above described alkylatable saturated hydrocarbons may also be effected in the presence of the hereinabove referred to catalyst by reacting saturated hydrocarbons with certain substances capable of producing olefinic hydrocarbons under the conditions of operation chosen for the process. Such olefin producing substances include alkyl halides capable of undergoing dehydrohalogenation to form olefinic hydrocarbons containing at least two carbon atoms per molecule. The alkyl halides comprise a particularly desirable group of compounds which act as olefins in admixture with alkylatable paraffin hydrocarbons and the catalyst of the present invention, since in the reaction hydrogen halide is produced. Such hydrogen halide is often a desirable component in the process of the present invention, and in some cases is added directly. Also, in other cases, it is desirable to utilize mixtures of the above described olefin-acting compounds and alkyl halides. A specific example of such a mixture is propylene and isopropyl chloride or a butane and secondary or tertiary butyl chloride. In such a case, olefinic hydrocarbons and the above-mentioned olefin producing substances are herein referred to as olefin-acting compounds.

In accordance with the process of the present invention, the alkylation of saturated hydrocarbons reaction, to produce hydrocarbons of more highly branched chain structure and of higher molecular weight than the hydrocarbons charged to the process, is effected in the presence of the above indicated catalyst at a temperature of from about −30° C. to about 125° C. or higher, and preferably from about 0° C. to above 75° C. although the exact temperature required for a particular alkylation reaction will depend upon the specific reactants employed and upon the specific catalyst utilized as well as the respective quantities thereof.

The alkylation reaction is usually carried out at a pressure of from about atmospheric to about 100 atmospheres and preferably under sufficient pressure to maintain the reactants and the products in substantially liquid phase. In the hydrocarbon mixture subjected to alkylation, it is preferable to have present about 2 to about 10 or more, sometimes up to 20, and sometimes even up to 100 or more, molecular proportions of alkylatable saturated hydrocarbon for 1 molecular proportion of olefin-acting compound introduced thereto, particularly olefin hydrocarbon. Higher molecular ratios of alkylatable saturated hydrocarbon to olefin are especially desirable when the process is employed for the alkylation of a high molecular weight olefin boiling generally higher than pentanes, since these olefins frequently undergo depolymerization prior to or substantially simultaneously with alkylation so that one molecular proportion of such an olefin will thus alkylate two or more molecular proportions of alkylatable saturated hydrocarbon. The higher molecular ratios of alkylatable saturated hydrocarbon to olefin also tend to reduce polymerization of the olefin (particularly low molecular weight olefins) and tend to reduce the formation of polyalkylated products because of the operation of a law of mass action. In some cases, it may be desirable to maintain or employ an atmosphere of hydrogen within the reaction zone or in some cases it may be desirable to maintain or employ an atmosphere of nitrogen or other inert gas.

In converting saturated hydrocarbons to effect the alkylation thereof with the type of catalyst hereinabove described, either batch or continuous operations may be employed. The actual operation of the process admits of some modification depending on the normal phase of the reacting constituents and whether batch or continuous operations are employed.

In a simple type of batch operation, a paraffin hydrocarbon to be alkylated, such as for example isobutane, is brought to a temperature within the approximate range specified in the presence of a catalyst comprising a Friedel-Crafts metal halide impregnated on an oxide of a metal of the iron group composited with diatomaceous earth having a concentration corresponding to a sufficient high activity, and alkylation is effected by the gradual introduction under pressure of an olefin, such as 2-butene, in a manner to attain contact between the catalyst and the reactant compounds.

In another method of operation, a saturated hydrocarbon may be mixed with an olefin at a suitable temperature, the catalyst, comprising a Friedel-Crafts metal halide impregnated on an oxide of a metal of the iron group composited with a diatomaceous earth, is added and the alkylation reaction is induced by sufficiently long contact with the catalyst. Alkylation may be allowed to progress to different stages depending upon contact time. In the case of alkylation of isobutane with normally gaseous olefins, the best results from a standpoint of motor fuel production usually are produced by the condensation of equimolar quantities of paraffin hydrocarbons and olefins. After a batch treatment, the hydrocarbons are separated from the catalyst in any suitable manner such as by decantation or quenching with water and the hydrocarbon fraction or layer is then subjected to fractionation for the recovery of an intermediate boiling range hydrocarbon fraction utilizable as a motor fuel.

In one type of continuous operation, a liquid isoparaffin may be pumped through a reactor containing the mixed catalyst per se or further commingled with a suitable support. The olefin-acting compounds may be added to the isoparaffin stream just prior to contact of the stream with the solid catalyst bed, or it may be introduced in multistages at various points in the catalyst bed. It is also within the scope of the present invention to add a hydrogen halide such as hydrogen chloride or hydrogen bromide or an alkyl halide to the process of the present invention, the addition being carried out either continuously or intermittently. In such an operation, the original paraffin hydrocarbon stream, such as isobutane, may contain sufficient dissolved hydrogen chloride to induce the desired catalytic activity of the catalyst comprising aluminum chloride impregnated on nickel oxide composited with diatomaceous earth and after this desired catalytic activity has been induced in situ the paraffin hydrocarbon stream can be utilized without prior contacting or combination with hydrogen chloride. As stated hereinabove instead of hydrogen chloride, an alkyl halide such as isopropyl chloride, which undergoes dehydrohalogenation under the conditions of the reaction may be utilized. The details of continuous processes of this general character are familiar to those skilled in refinery operations and any necessary additions to or modifications from the above description will be more or less obvious and can be made without departing from the generally broad scope of this invention.

The process of the present invention is illustrated by the following examples which are introduced solely for the purpose of illustration and with no intention of unduly limiting the generally broad scope of this invention. The examples, in addition to illustrating the operability of the process of this invention, present comparative data whereby the advantages of the catalyst composite of this invention, at the moderate alkylation conditions herein employed, are readily recognized.

These examples are the result of experiments carried out in a once-through bench scale pilot plant in which the reactor was maintained at a pressure of at least 300 pounds per square inch to insure liquid phase operation. The bench scale pilot plant consisted of a 1″ I.D. stainless steel reactor comprising a 15″ spiral pre-heater and a 10″ reaction chamber. A blended charge stock was charged to the top of the reactor from a Jerguson type charger by means of a pressure pump. The reactor effluent was passed through a back pressure regulator and thereby reduced to atmospheric pressure. The reactor effluent was then passed to a cold finger stabilizer wherein the liquid product was separated from the unreacted gases which were condensed in a series of two Dry Ice-acetone traps. Any uncondensed gases were measured by a wet test meter. In all cases the runs were made at a 16 LHSV. A ½ hour pre-run preceded the one hour test run.

A catalyst was prepared by suspending diatomaceous earth in an aqueous solution of nickel sulfate, and a hot saturated aqueous solution of sodium carbonate was added thereto slowly and with agitation. The liquid was decanted and the diatomaceous earth, containing the precipitated nickel carbonate, was water washed and dried. This material was then admixed with about 4% graphite and made into pelleted form. The pellets were heated at about 430° C. and carbon dioxide was driven off leaving about 65 wt. percent nickel oxide composited with diatomaceous earth. This catalyst was separated into two portions. The first portion was designated as catalyst "A" and subsequently used in Example II.

The second portion, consisting of about 148 gms. of said catalyst, was added to a rotating flask containing therein about 32 gms. of anhydrous aluminum chloride. The flask was rotated and heated under anhydrous conditions. The walls of the flask were heated to prevent the sublimation of the aluminum chloride thereon. When it appeared that substantially all of the aluminum chloride had sublimed on the catalyst pellets the flask was cooled. The nickel oxide on diatomaceous earth had 31 grams of aluminum chloride sublimed thereon. This catalyst was designated as catalyst "B" and was subsequently utilized in Example I below.

*Example I*

100 cc. of catalyst "B" was placed in the reaction chamber of the previously described bench scale pilot plant, and 1600 cc. of an isobutane-ethylene blend containing about 57.3 grams of ethylene and about 0.2 vol. percent isopropyl chloride as a promoter, was charged thereto at about room temperature at an LHSV of 16 for a one hour test period. The reactor was maintained at a pressure of about 450 p.s.i.

The reactor effluent was recovered in the manner above described. The recovery of $C_5+$ alkylation product amounted to 193 wt. percent based on the weight of the ethylene charge.

*Example II*

100 cc. of catalyst "A" was charged to the reaction chamber of the aforesaid bench scale pilot plant and 1600 cc. of an isobutane-ethylene blend containing about 72.8 grams of ethylene and about 0.2 vol. percent isopropyl chloride as a promoter, was charged thereto at substantially the same alkylation conditions of Example I. The reactor effluent was recovered in the prescribed manner. The recovery of $C_5+$ alkylation product amounted to 1.4 wt. percent based on the weight of the ethylene charged. This example illustrates the relative inactivity of nickel oxide on diatomaceous earth in the absence of aluminum chloride.

*Example III*

A third catalyst was prepared by adding about 50 grams of pelleted diatomaceous earth to a rotating flask containing therein about 30 grams of anhydrous aluminum chloride and the flask was rotated and heated at anhydrous conditions. The walls of the flask were heated to prevent sublimation of the aluminum chloride thereon. When it appeared that the sublimation of the aluminum chloride on the diatomaceous earth pellets was substantially complete the flask was cooled and the catalyst recovered. The 50 grams of pelleted diatomaceous earth had 23 grams of aluminum chloride sublimed thereon.

100 cc. of the catalyst was placed in the aforementioned reaction chamber and 1600 cc. of an isobutane-ethylene blend, containing about 44.4 grams of ethylene and about 0.2 vol. percent isopropyl chloride as a promoter, was charged thereto at substantially the same alkylation conditions of Example I. The reactor effluent was recovered in the prescribed manner. The recovery of $C_5+$ alkylation product amounted to 16.2 wt. percent based on the weight of the ethylene charged. This example, when compared wtih Example I, serves to illustrate the enhanced activity of the catalyst of this invention, at the moderate alkylation conditions employed, with respect to aluminum chloride on diatomaceous earth in the absence of nickel oxide.

*Example IV*

For this example 48 grams of pelleted diatomaceous earth and 21 grams of nickel shot was added to a rotating flask containing therein about 15 grams of anhydrous aluminum chloride. The flask was rotated and heated at anhydrous conditions until it appeared that sublimation of the aluminum chloride on the nickel shot and the pelleted diatomaceous earth was substantially complete. Thereafter the catalyst was recovered and found to contain 15 grams of aluminum chloride distributed on 48 grams of pelleted diatomaceous earth and 21 grams of nickel shot.

100 cc. of this catalyst was charged to the reaction chamber of the bench scale pilot plant and 1600 cc. of an isobutane-ethylene blend containing about 58.3 grams of ethylene and about 0.2 vol. percent isopropyl chloride as a promoter was charged to the reactor at substantially the same alkylation conditions of Example I. The reactor effluent was recovered in the prescribed manner. The recovery of $C_5+$ alkylation product amounted to 17.9 wt. percent based on the weight of the ethylene charged. This example illustrates that utilization of nickel oxide in the catalyst of this invention results in a more active alkylation catalyst than is obtained by the use of nickel.

*Example V*

This example is presented to illustrate the advantages of the catalyst of this invention with respect to a Friedel-Crafts metal halide on an inert support at the moderate alkylation conditions herein employed. For this example 61.5 gms. of aluminum chloride was sublimed onto 89.6 gms. of ⅛ inch glass beads under anhydrous conditions. 100 cc. of this catalyst was placed in the reaction chamber of the reactor and 1600 cc. of an isobutane-ethylene blend containing about 61.3 grams of ethylene and about 0.2 vol. percent isopropyl chloride as a promoter, was charged thereto at about room temperature at an LHSV of 16 for a one hour test period. The reactor was maintained at about 450 p.s.i.

The reactor effluent was recovered in the prescribed manner. A substantial amount of sludge settled out in the cold finger stabilizer and the liquid product was decanted therefrom. The recovery of $C_5+$ alkylation product amounted to 88 wt. percent based on the weight of the ethylene charged.

I claim as my invention:

1. A process for the alkylation of an alkylatable saturated hydrocarbon which comprises reacting the same with an olefin-acting compound at an alkylation temperature of from about $-30°$ C. to about $125°$ C. in the presence of a catalyst comprising a Friedel-Crafts metal halide impregnated on an oxide of a metal of the iron group composited with an adsorbent siliceous material.

2. A process for the alkylation of an alkylatable paraffin hydrocarbon which comprises reacting the same with an olefin-acting compound at an alkylation temperature of from about $-30°$ C. to about $125°$ C. in the presence of a catalyst comprising a Friedel-Crafts metal halide impregnated on an oxide of a metal of the iron group composited with an adsorbent siliceous material.

3. A process for the alkylation of an alkylatable cycloparaffin hydrocarbon which comprises reacting the same with an olefin-acting compound at an alkylation temperature of from about $-30°$ C. to about $125°$ C. in the presence of a catalyst comprising a Friedel-Crafts metal halide impregnated on an oxide of a metal of the iron group composited with an adsorbent siliceous material.

4. A process for the alkylation of an alkylatable isoparaffin which comprises reacting the same with an olefin-acting compound at an alkylation temperature of from about $-30°$ C. to about $125°$ C. in the presence of a catalyst comprising a Friedel-Crafts metal halide impregnated on an oxide of a metal of the iron group composited with an adsorbent siliceous material.

5. A process for the alkylation of an alkylatable saturated hydrocarbon which comprises reacting the same with an olefin-acting compound at an alkylation temperature of from about $-30°$ C. to about $125°$ C. in the presence of a catalyst comprising aluminum chloride impregnated on an oxide of a metal of the iron group composited with an adsorbent siliceous material.

6. A process for the alkylation of an alkylatable paraffin hydrocarbon which comprises reacting the same with an olefin-acting compound at an alkylation temperature of from about −30° C. to about 125° C. in the presence of a catalyst comprising aluminum chloride impregnated on an oxide of a metal of the iron group composited with an adsorbent siliceous material.

7. A process for the alkylation of an alkylatable cycloparaffin hydrocarbon which comprises reacting the same with an olefin-acting compound at an alkylation temperature of from about −30° C. to about 125° C. in the presence of a catalyst comprising aluminum chloride impregnated on an oxide of a metal of the iron group composited with an adsorbent siliceous material.

8. A process for the alkylation of an alkylatable isoparaffin which comprises reacting the same with an olefin-acting compound at an alkylation temperature of from about −30° C. to about 125° C. in the presence of a catalyst comprising aluminum chloride impregnated on an oxide of a metal of the iron group composited with an adsorbent siliceous material.

9. A process for the alkylation of an alkylatable isoparaffin which comprises reacting the same with an olefin-acting compound at an alkylation temperature of from about −30° C. to about 125° C. in the presence of a catalyst comprising aluminum chloride impregnated on nickel oxide composited with an adsorbent siliceous material.

10. A process for the alkylation of an alkylatable isoparaffin which comprises reacting the same with an olefin at an alkylation temperature of from about −30° C. to about 125° C. in the presence of a catalyst comprising aluminum chloride impregnated on nickel oxide composited with an adsorbent siliceous material.

11. A process for the alkylation of isobutane which comprises reacting the same with an olefin-acting compound at an alkylation temperature of from about −30° C. to about 125° C. in the presence of a catalyst comprising aluminum chloride impregnated on nickel oxide composited with an adsorbent siliceous material.

12. A process for the alkylation of isobutane which comprises reacting the same with an olefin at an alkylation temperature of from about −30° C. to about 125° C. in the presence of a catalyst comprising aluminum chloride impregnated on nickel oxide composited with an adsorbent siliceous material.

13. A process for the alkylation of isobutane which comprises reacting the same with an olefin-acting compound at an alkylation temperature of from about −30° C. to about 125° C. in the presence of a catalyst comprising aluminum chloride impregnated on nickel oxide composited with diatomaceous earth.

14. A process for the alkylation of isobutane which comprises reacting the same with an olefin at an alkylation temperature of from about −30° C. to about 125° C. in the presence of a catalyst comprising aluminum chloride impregnated on nickel oxide composited with diatomaceous earth.

15. A process for the alkylation of isobutane which comprises reacting the same with ethylene at an alkylation temperature of from about −30° C. to about 125° C. in the presence of a catalyst comprising aluminum chloride impregnated on nickel oxide composited with diatomaceous earth.

16. A process for the alkylation of isobutane which comprises reacting the same with propylene at an alkylation temperature of from about −30° C. to about 125° C. in the presence of a catalyst comprising aluminum chloride impregnated on nickel oxide composited with diatomaceous earth.

17. A process for the alkylation of isobutane which comprises reacting the same with 2-butene at an alkylation temperature of from about −30° C. to about 125° C. in the presence of a catalyst comprising aluminum chloride impregnated on nickel oxide composited with diatomaceous earth.

18. A process for the alkylation of isobutane which comprises reacting the same with 1-butene at an alkylation temperature of from about −30° C. to about 125° C. in the presence of a catalyst comprising aluminum chloride impregnated on nickel oxide composited with diatomaceous earth.

19. A process for the alkylation of isobutane which comprises reacting the same with isobutene at an alkylation temperature of from about −30° C. to about 125° C. in the presence of a catalyst comprising aluminum chloride impregnated on nickel oxide composited with diatomaceous earth.

References Cited in the file of this patent

UNITED STATES PATENTS

| | | |
|---|---|---|
| 2,318,781 | Ipatieff et al. | May 11, 1943 |
| 2,332,276 | Stahly | Oct. 19, 1943 |